United States Patent
Xu et al.

(10) Patent No.: US 12,283,085 B2
(45) Date of Patent: Apr. 22, 2025

(54) DATA LABELING METHOD BASED ON ARTIFICIAL INTELLIGENCE, APPARATUS AND STORAGE MEDIUM

(71) Applicant: Beijing Baidu Netcom Science Technology Co., Ltd., Beijing (CN)

(72) Inventors: Siqi Xu, Beijing (CN); Ke Sun, Beijing (CN); Jian Gong, Beijing (CN); Xu Pan, Beijing (CN); Zhiqun Xia, Beijing (CN); Zhe Yang, Beijing (CN); Zecheng Zhuo, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 398 days.

(21) Appl. No.: 17/902,323

(22) Filed: Sep. 2, 2022

(65) Prior Publication Data

US 2023/0316709 A1     Oct. 5, 2023

(30) Foreign Application Priority Data

Mar. 31, 2022 (CN) .......................... 202210335852.0

(51) Int. Cl.
*G06V 10/762* (2022.01)
*G06F 16/28* (2019.01)
(Continued)

(52) U.S. Cl.
CPC .......... *G06V 10/762* (2022.01); *G06F 16/285* (2019.01); *G06V 10/761* (2022.01); *G06V 10/764* (2022.01)

(58) Field of Classification Search
CPC .. G06V 10/762; G06V 10/761; G06V 10/764; G06F 16/285; G06F 16/906; G06F 18/23; G06F 18/214; G06N 20/00
See application file for complete search history.

(56) References Cited

U.S. PATENT DOCUMENTS 10,025,950 B1    7/2018  Avasarala et al.
2005/0234955 A1*  10/2005  Zeng ..................... G06F 16/355
(Continued)

FOREIGN PATENT DOCUMENTS

CN    108764319 A    11/2018
CN    110232414 A    9/2019
(Continued)

OTHER PUBLICATIONS

Notice of Reasons for Refusal received in Japanese Application No. 2022-125529 dated Aug. 15, 2023 in 8 pages.
(Continued)

*Primary Examiner* — Bobbak Safaipour
*Assistant Examiner* — Michael Kim Maiden
(74) *Attorney, Agent, or Firm* — Knobbe Martens Olson & Bear LLP

(57) ABSTRACT

Provided is a data labeling method based on artificial intelligence, an apparatus, and a storage medium relating to the field of artificial intelligence, particularly data labeling, image recognition, and natural language processing. The method includes: determining a plurality of samples involved in clustering; performing a plurality of following operations circularly to realize iterative processing, until a convergence condition is satisfied or a quantity of iterations reaches a number threshold, comprising: pre-clustering the plurality of samples according to a vector representation of the respective samples to obtain a plurality of class clusters, each class cluster containing at least one sample; receiving labeling information for the respective class clusters and re-determining the plurality of samples according to the labeling information; and determining a clustering result according to the labeling information for the respective class clusters.

17 Claims, 4 Drawing Sheets

(51) Int. Cl.
*G06V 10/74* (2022.01)
*G06V 10/764* (2022.01)

(56) References Cited

U.S. PATENT DOCUMENTS

| | | | |
|---|---|---|---|
| 2009/0132568 A1* | 5/2009 | Syeda-Mahmood | ........................ G06V 10/764 707/E17.046 |
| 2016/0180556 A1* | 6/2016 | Deng | .................... G06T 11/206 345/440 |
| 2018/0165554 A1* | 6/2018 | Zhang | .................... G06N 3/045 |
| 2019/0339965 A1* | 11/2019 | Garvey | ............. G06F 16/24578 |
| 2020/0272667 A1* | 8/2020 | Ding | .................... G06F 16/901 |

FOREIGN PATENT DOCUMENTS

| | | |
|---|---|---|
| CN | 113411645 A | 9/2021 |
| CN | 114090769 A | 2/2022 |
| CN | 114118180 A | 3/2022 |
| JP | 2018120320 A | 8/2018 |
| JP | 2020042330 A | 8/2018 |
| JP | 2022506274 A | 1/2022 |
| WO | WO 2020119053 A1 | 6/2020 |

OTHER PUBLICATIONS

First Office Action in Chinese Application No. 202210335852.0 dated Jul. 8, 2023.

* cited by examiner

DATA LABELING METHOD BASED ON ARTIFICIAL INTELLIGENCE, APPARATUS AND STORAGE MEDIUM

CROSS-REFERENCE TO RELATED APPLICATIONS

The present application claims priority to Chinese Patent Application No. CN202210335852.0, filed with the China National Intellectual Property Administration on Mar. 31, 2022, the disclosure of which is hereby incorporated herein by reference in its entirety.

TECHNICAL FIELD

The present disclosure relates to the field of artificial intelligence, and in particular, to fields of data labeling, image recognition, and natural language processing technologies.

BACKGROUND

A clustering labeling algorithm, which is also called a clustering analysis algorithm or a group analysis method, is a statistical analysis method for studying a classification problem, and is also an important algorithm for data mining. Clustering analysis is based on similarity, and patterns in one cluster have more similarities than patterns not in the same cluster.

In real business, it is often necessary to divide real class clusters. For example, to evaluate an effect of a cluster task, a test set may be used for evaluation. The test set is a plurality of mutually exclusive real clusters divided from a quantity of samples according to a cluster standard, which needs to be divided manually, if the quantity of samples is large, a workload of labeling will be too large, resulting in low accuracy of clustering labeling.

SUMMARY

The present disclosure provides data labeling method and device based on artificial intelligence, an apparatus, and a storage medium.

According to one aspect of the present disclosure, provided is a data labeling method based on artificial intelligence, including: determining a plurality of samples involved in clustering; performing the following operations circularly to realize iterative processing, until a convergence condition is satisfied or a quantity of iterations reaches a number threshold: pre-clustering the plurality of samples involved in clustering, according to a vector representation of the respective samples involved in clustering to obtain a plurality of class clusters, each class cluster containing at least one sample involved in clustering, receiving labeling information for the respective class clusters, and re-determining the plurality of samples involved in clustering, according to the labeling information; and determining a clustering result according to the labeling information for the respective class clusters.

According to another aspect, provided is a clustering device, including: a screening module configured to determine a plurality of samples involved in clustering; a clustering module configured to pre-cluster the plurality of samples involved in clustering, according to a vector representation of the respective samples involved in clustering determined by the screening module or a processing module to obtain a plurality of class clusters, each class cluster containing at least one sample involved in clustering; and the processing module configured to receive labeling information for the respective class clusters, re-determine the plurality of samples involved in clustering, according to the labeling information, and notify the clustering module of the determined plurality of samples involved in clustering, to realize iterative processing; and determine a clustering result according to the labeling information for the respective class clusters, in a case of a convergence condition is satisfied or a quantity of iterations reaches a number threshold.

According to another aspect, provided is an electronic apparatus, including: at least one processor; and a memory connected in communication with at least one processor; where the memory stores an instruction executable by the at least one processor, and the instruction, when executed by the at least one processor, enables the at least one processor to execute the above data labeling method based on artificial intelligence.

According to another aspect, provided is a non-transitory computer-readable storage medium storing a computer instruction thereon, where the computer instruction is used to enable a computer to execute the above data labeling method based on artificial intelligence.

According to another aspect, provided is a computer program product including a computer program, and when the computer program is executed by a processor, the above data labeling method based on artificial intelligence is implemented.

The disclosure first pre-clusters samples involved in clustering to obtain a plurality of class clusters; then division of each class cluster is realized according to labeling information, and iterations are performed for many times, and finally, a clustering result is obtained. Because a quantity of samples in each class cluster is small, workload of labeling is small, which can improve accuracy of clustering labeling.

It should be understood that the contents described in this part are not intended to identify key or important features of embodiments of the present disclosure, nor is it used to limit the scope of the present disclosure. Other features of the present disclosure will be easily understood by the following description.

BRIEF DESCRIPTION OF THE DRAWINGS

The accompanying drawings are used to better understand the present solution and do not constitute limitations of the present disclosure.

DETAILED DESCRIPTION

Hereinafter, descriptions to exemplary embodiments of the present disclosure are made with reference to the accompanying drawings, include various details of the embodiments of the present disclosure to facilitate understanding, and should be considered as merely exemplary. Therefore, those of ordinary skill in the art should realize that various changes and modifications may be made to the embodiments described herein, without departing from the scope and spirit of the present disclosure. Likewise, for clarity and conciseness, descriptions of well-known functions and structures are omitted in the following descriptions.

Generally, to evaluate an effect of a clustering task, data needs to be labeled as mutually exclusive real clusters to get an accurate evaluation result, therefore, in real business, many clustering tasks need to be evaluated based on labeled data, for example, in a construction of an event database, real-time news describing the same event needs to be clustered into one event and stored in the event database to provide a data analysis basis for event analysis by taking an event as a granularity. Take an event clustering as an example, ideally, effect of the clustering needs to meet two following requirements.

1. Pieces of News in the same cluster describe the same event, which means accuracy.
2. All the news describing the same event are in one cluster and will not be scattered into multiple clusters, which means recall rate.

To calculate the accuracy and the recall rate, it is necessary to cluster the data accurately, that is, divide a test set into multiple mutually exclusive real clusters according to cluster standards of different business scenarios.

Without considering labeling quantity and manual labeling costs, simple and direct labeling which manually labels all samples may be adopted. In general, it is often necessary to consider the labeling quantity and the related costs, an existing evaluation scheme performs labeling mainly based on a relevance recall method, which limits an amount of data involved in evaluating, and cannot obtain all real clusters of the entire test set, so the accuracy of the clustering is insufficient.

In view of the above problems, the present disclosure proposes a data labeling method based on artificial intelligence, the method selects representative samples by taking a class cluster as a granularity to perform multiple rounds of iterative clustering labeling, which may improve accuracy of a result of clustering while reducing the labeling quantity.

In view of the above problems, the present disclosure proposes a data labeling method based on artificial intelligence, the method performs the multiple rounds of iterative clustering labeling by taking the cluster as the granularity and quickly obtains global real clusters while reducing the labeling quantity.

Figure 1:
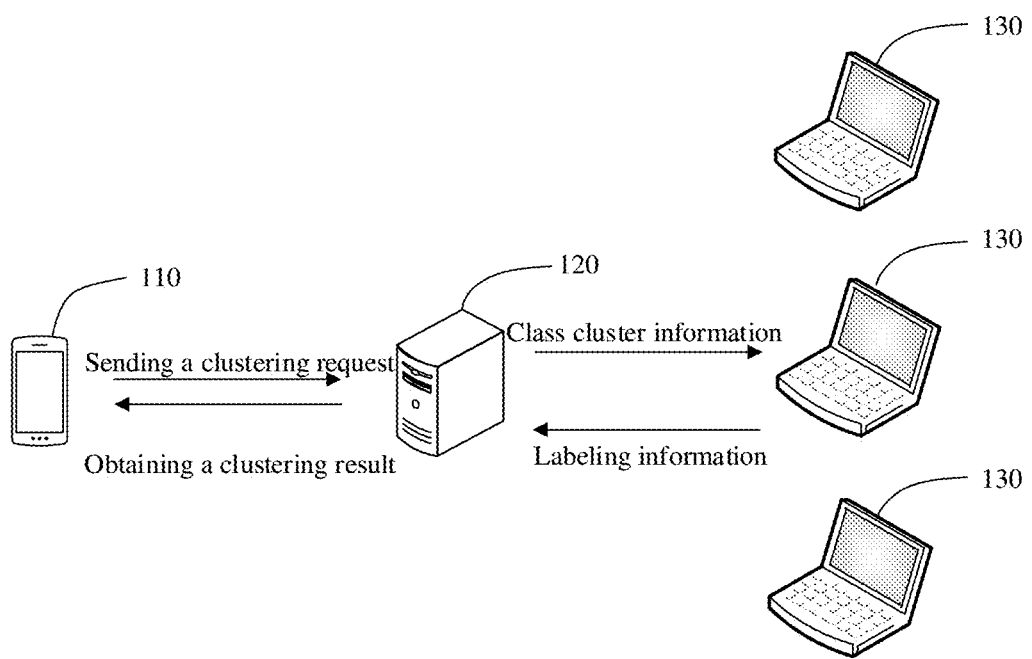
FIG. 1 shows a schematic diagram of an application scenario according to the embodiments of the present disclosure.

The present disclosure proposes a data labeling method based on artificial intelligence, which may be applied to an application scenario shown in FIG. 1. As shown in FIG. 1, the application scenario may include a client terminal 110 and a server 120. Taking a device in which the method is applied deployed in the server as an example, a user may send a request for using the data labeling method based on artificial intelligence to the server 120 through the client terminal 110, after the server 120 clusters samples by using the data labeling method based on artificial intelligence, a clustering result is fed back to a labeling terminal 130, which may receive class cluster information obtained by the clustering and label and divide class clusters, and may send labeling information to the server 120 again after the labeling is completed, the server 120 continues to use the data labeling method based on artificial intelligence to generate new class cluster information after receiving the labeling information, in this way, a final clustering result is obtained after multiple iterations.

The client terminal 110 and the labeling terminal 130 may be connected to the server 120 through a wireless network or a wired network. Alternatively, the client terminal 110 and the labeling terminal 130 may be a smartphone, a tablet computer, a laptop computer, a desktop computer, a smart watch, a vehicle terminal, and the like, respectively, but are not limited thereto. The client terminal 110 may install and run an application that supports the data labeling method based on artificial intelligence. There may be a plurality of the label terminals 130. The client terminal 110 that sends the request for using the data labeling method based on artificial intelligence to the server 120 and the labeling terminal 130 that performs the labeling and division may be the same or different terminals.

The server 120 may be an independent server, or a server group or a distributed system, or a cloud server that provides basic cloud computing services such as a cloud service, a cloud database, a cloud computing, a cloud function, cloud storage, a network service, a cloud communication, a middleware service, and big data and an artificial intelligence platform.

Figure 2:
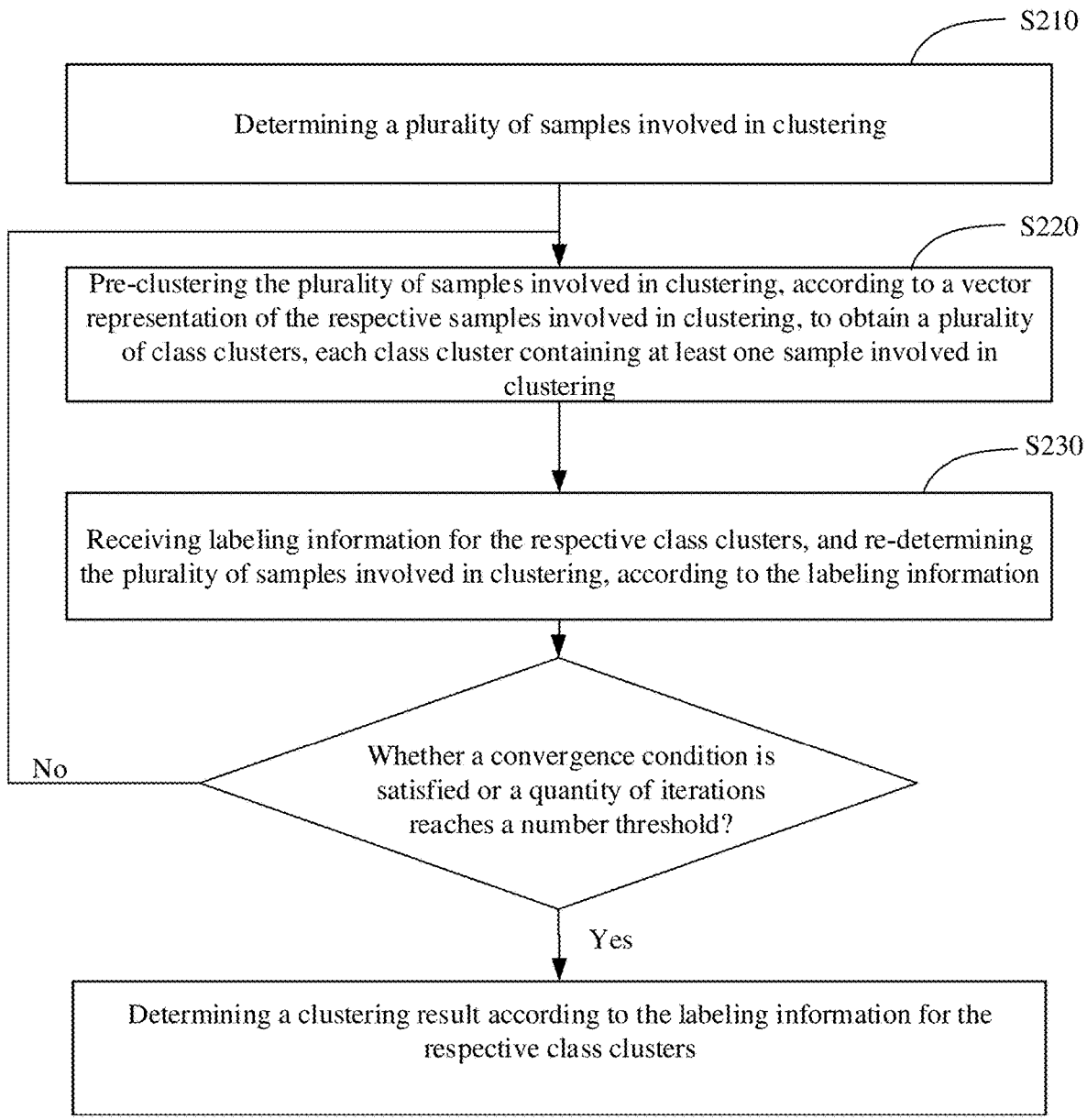
FIG. 2 is a schematic diagram of an implementation flow of a data labeling method based on artificial intelligence according to the embodiments of the present disclosure.

FIG. 2 is a schematic diagram of an implementation flow of the data labeling method based on artificial intelligence according to the embodiments of the present disclosure, the method includes at least the followings.

In S210, a plurality of samples involved in clustering are determined.

In S220, the plurality of samples involved in clustering are pre-clustered, according to a vector representation of each sample involved in clustering, to obtain a plurality of class clusters, and each class cluster contains at least one sample involved in clustering.

In S230, labeling information for each class cluster is received, the plurality of samples involved in clustering are re-determined according to the labeling information, and then the method returns to step S220 to realize iterative processing; and a clustering result is determined according to the labeling information for each class cluster, in a case where a convergence condition is satisfied, or a quantity of iterations reaches a number threshold.

It can be seen that the data labeling method based on artificial intelligence proposed in the present disclosure adopts an iterative clustering manner, and each iteration includes pre-clustering the plurality of samples involved in clustering and dividing the plurality of samples involved in clustering into the plurality of class clusters; determining representative samples from each class cluster according to the labeling information, and taking the representative samples as the samples involved in clustering in a next iteration. In the present disclosure, during each iteration process, after pre-clustering, a quantity of the samples in each class cluster is small, which is convenient for subsequent accurate labeling, thereby improving accuracy of the clustering.

In some possible implements, the above samples may be image samples or text samples, that is, the method may be applied to cluster images or text.

In some possible implements, the vector representations of the above samples may be obtained by using a neural network model, which may include an Enhanced Representation from kNowledge intEgration (ERNIE) model or a Bidirectional Encoder Representation from transformers (BERT) model, and also may be other models, which are not limited thereto.

In some possible implements, the labeling information for the class cluster may include at least one sub-cluster contained in the class cluster and a representative sample in each sub-cluster.

The above re-determining of the plurality of samples involved in clustering according to the labeling information may include taking the representative sample in each sub-cluster in the labeling information for each class cluster as the re-determined plurality of samples involved in clustering.

In the embodiments of the present disclosure, a labeling person may label each class cluster generated by the pre-clustering into mutually exclusive sub-clusters by taking the class cluster as the granularity, and then manually select a sample having representativeness in each sub-cluster to enter a next round of clustering. The sample having representativeness selected from each sub-cluster may be called the representative sample, and the remaining samples may be called non-representative samples. For example, the labeling person may select a sample with reduced and unitary expression in each sub-cluster to enter the next round of clustering, and the representative samples can be determined according to the labeling information after receiving the labeling information of the labeling person for each class cluster, and these representative samples will be involved in the next round of clustering. The unity of the representative samples can avoid a problem of information transmission. Moreover, in the second step of each iteration, each class cluster is divided into multiple sub-clusters, and each sub-cluster has a representative sample for the next iteration, which can quickly reduce a quantity of samples involved in clustering in the next iteration.

In some possible implements, the above pre-clustering of the plurality of samples involved in clustering according to the vector representation of each sample involved in clustering includes pre-clustering the samples involved in clustering by using a cluster algorithm in combination with a restriction condition, so that each class cluster obtained by the pre-clustering may satisfy the restriction condition.

In some possible implements, the above restriction condition includes at least one of the followings.

(1) The quantity of samples involved in clustering contained in each class cluster is not greater than a sample number threshold.

(2) The samples involved in clustering contained in each class cluster belong to different class clusters in the pre-clustering process of the previous iteration.

The above restriction conditions are mainly set for the following considerations.

First, in view of the above restriction condition (1), setting the sample number threshold may ensure that the quantity of the samples in each class cluster obtained by pre-clustering will not be too large, which is convenient for labeling, so it can reduce requirements for the labeling person, thereby improving accuracy of division (each class cluster is divided into the plurality of sub-clusters) of the class clusters, and improving accuracy of the final clustering result.

Second, in view of the above restriction condition (2), the restriction condition (2) ensures that two samples divided into the same class cluster in the previous iteration process will not be divided into the same class cluster again if they enter the next iteration at the same time. This is because the two samples entering the next iteration are samples that have been manually labeled as mutually exclusive samples (i.e., samples belong to different categories), so it is no longer necessary to classify them into the same class cluster.

In some possible implements, the above cluster algorithm may be various. The following describes a density peaks algorithm as an example, the implementation of pre-clustering the plurality of samples involved in clustering by using the density peaks algorithm in combination with the above restriction conditions may include the followings.

In Step 1, a density of each sample involved in clustering is determined.

In Step 2, the following operations for each sample involved in clustering is performed according to a descending order of densities: determining a plurality of neighboring samples of the sample involved in clustering; traversing each neighboring sample in sequence according to a descending order of similarities between the neighboring samples and the sample involved in clustering, adding the sample involved in clustering to a class cluster to which the neighboring sample belongs if all the following first judgment conditions are satisfied; and establishing a new class cluster if at least one of the following first judgment conditions is not satisfied, the new class cluster includes the sample involved in clustering.

The above first judgment conditions include the followings.

(1) A density of the neighboring sample is greater than that of the sample involved in clustering.

(2) The neighboring sample belongs to a class cluster.

(3) The similarity between the neighboring sample and the sample involved in clustering is greater than or equal to a similarity threshold.

(4) A quantity of samples in the class cluster to which the neighboring sample belongs is less than the sample number threshold.

(5) The neighboring sample and the sample involved in clustering belong to different class clusters in the pre-clustering process of the previous iteration.

It can be seen from the above first judgment conditions that the above first judgment conditions (1)-(3) are judgment conditions in the density peaks algorithm, and the above first judgment conditions (4) and (5) are judgment conditions added to satisfy the above restriction conditions.

A specific example includes the following steps.

In Step 1, densities of n samples involved in clustering are determined.

Specifically, a vector retrieval tool may be used to obtain K (top-K) neighboring samples with the greatest similarities to each sample, and K is a positive integer. For example, a Facebook AI Similarity Search (FAISS) algorithm or a K-Nearest Neighbor (KNN) algorithm is used for obtaining the neighboring samples.

Then, for each sample, an average similarity of the similarities between the sample and the top-K neighboring samples is taken as the density of the sample.

The similarity between sample and the neighboring sample may be determined by a Euclidean distance or a cosine of an included angle. The cosine of the included angle between two vector representations of two samples is also called a cosine similarity, which is metric for a size of a difference between two individuals by using a cosine value of the included angle between the two vectors in a vector space. If the two vectors have the same direction, that is, the included angle is close to zero, the closer the two vector representations are.

For example, a vector of a sample a is represented as $\vec{a}$ (x1, y1), and a vector of a sample b is represented as $\vec{b}$ (x2, y2), the cosine similarity between the sample a and the sample b is determined by using the cosine of the included angle:

$$\cos\theta = \frac{x_1 x_2 + y_1 y_2}{\sqrt{x_1^2 + y_1^2} \times \sqrt{x_2^2 + y_2^2}}.$$

Alternatively, the cosine similarity between the sample a and the sample b may be determined directly through a vector operation:

$$\cos\theta = \frac{\vec{a} \cdot \vec{b}}{|\vec{a}||\vec{b}|}.$$

In Step 2, the samples involved in clustering are sorted according to the descending order of the densities. For example, the sorted samples includes a sample A, a sample B, a sample C, . . . , and the like.

Judgments between each sample and the neighboring samples are made respectively according to the above order, to judge whether to add the sample to the class cluster to which the neighboring sample belongs.

Taking the sample A as an example, it is assumed that the neighboring samples of the sample A include a sample 1, a sample 2, a sample 3, and the like, the sample 1, the sample 2, the sample 3, and the like are arranged in the order of the similarities, that is, the sample 1 has the highest similarity to the sample A, and the similarities of the subsequent sample 2, sample 3 and the like to the sample A gradually decrease.

In this case, it may first determine whether the sample A and the sample 1 satisfy all the above first judgment conditions, for example, if the density of the sample 1 is greater than that of the sample A, the sample 1 belongs to a class cluster (that is, the sample 1 belongs to an already formed class cluster, and it is assumed that the class cluster is X), and both the densities of the sample 1 and the sample A are greater than or equal to the similarity threshold, it indicates that the sample A satisfy a classification condition specified by the density peaks algorithm; moreover, if a quantity of samples contained in the class cluster to which the sample 1 belongs (such as the class cluster X) is less than the sample number threshold (e.g. which is set to N in advance), it indicates that the class cluster X may continue to add a new sample therein; moreover, if the sample 1 and the sample A belong to different class clusters in the previous iteration, the sample A may be added to the class cluster to which the sample 1 belongs (such as the class cluster X).

If the sample A is added to the class cluster to which the sample 1 belongs (i.e., the class cluster X), the processing for the sample A is completed, and the same operations may be continued for the sample B.

If the sample A and the sample 1 do not satisfy all the above first judgment conditions, it further judges whether the sample A and the next neighboring sample (i.e., the sample 2) satisfy all the above first judgment conditions. According to this order, if the sample A and all the neighboring samples do not satisfy all the above first judgment conditions, the sample A is classified into a new class cluster, that is, the new class cluster is established, which includes the sample A, then the processing for the sample A has also completed, and the same operations may be continued for the sample B.

The condition in which the density of the neighboring sample is greater than that of the sample involved in clustering among the above first judgment conditions means that the neighboring sample is closer to a density peaks region than the sample involved in clustering, at this time, the sample involved in clustering may be added to the class cluster to which the neighboring sample belongs, on the contrary, if the density of the neighboring sample is less than that of the sample involved in clustering, the sample involved in clustering should not be added to the class cluster to which the neighboring sample belongs.

The similarity between the neighboring sample and the sample involved in clustering being greater than or equal to the similarity threshold means that a distance between them in the vector space is close enough to make them be clustered into the same class cluster.

It can be seen that in the embodiments, the samples involved in clustering may be clustered into a plurality of class clusters that satisfy the restriction conditions by combining the cluster algorithm with the above restriction conditions.

In some possible implements, the above cluster algorithm may also be a K-means algorithm. The followings take the K-means algorithm as an example, and the implementation of pre-clustering the plurality of samples involved in clustering by using the K-means algorithm in combination with the above restriction conditions may include the following steps.

In Step 1, a part is selected from the plurality of samples involved in clustering, and each of the selected samples involved in clustering is taken as a cluster center.

In Step 2, for each sample involved in clustering other than the cluster centers, the sample involved in clustering is added to a class cluster to which the nearest cluster center belongs if all the following second judgment conditions are satisfied.

The above second judgment conditions include the followings.

(1) A quantity of samples in the class cluster to which the nearest cluster center belongs is less than the sample number threshold.

(2) The class cluster to which the nearest cluster center belongs does not include a sample belonging to the same class cluster as the sample involved in clustering in the pre-clustering process of the previous iteration.

In some possible implements, if at least one of the second judgment conditions is not satisfied, the sample involved in clustering is added to a class cluster to which another cluster center belongs.

The condition in which the quantity of the samples in the class cluster to which the nearest cluster center belongs is less than the sample number threshold among the above second judgment conditions may ensure that the quantity of the samples in each class cluster is not too large (that is, the quantity of the samples contained in each class cluster does not exceed the sample number threshold), which is convenient for labeling. The condition in which the class cluster to which the nearest cluster center belongs does not include the sample belonging to the same class cluster as the sample involved in clustering in the pre-clustering process of the previous iteration is set because that, during each round of labeling, the sub-clusters in each class cluster are mutually exclusive, and only one representative sample is selected from each sub-cluster to enter the next round, then if two samples are classified into the same class cluster in the previous round, it shows that the two samples in the previous round must belong to different sub-clusters that are mutually exclusive, that is, the two samples have been labeled as two samples which cannot be together in the previous round.

In some possible implements, the above convergence condition includes that the quantity of the samples contained in each class cluster is less than the sample number threshold.

In the embodiments, the quantity of the samples contained in each class cluster being less than the sample number threshold K indicates that there is no case where samples that should have been clustered together are scattered into multiple class clusters because the sample number threshold of samples contained in the class cluster is limited, that is, the samples that should have been clustered together have been clustered in the same class cluster to form a real cluster.

In some possible implements, the above number threshold is determined by the sample number threshold and the quantity of the samples involved in clustering in the first iteration process.

Specifically, the number threshold is a result of dividing a result obtained by subtracting 1 from the number n of the samples involved in clustering in the first iteration process by a result obtained by subtracting 1 from the sample number threshold K, that is $[(n-1)/(K-1)]$.

In some possible implements, the above sub-cluster includes one representative sample and at least one non-representative sample.

After taking the representative sample in each sub-cluster in the labeling information for each class cluster as the re-determined sample involved in clustering, the method also includes: for the representative sample, determining the non-representative sample that belongs to the same sub-cluster as the representative sample in the previous iteration; determining a sub-cluster to which the determined non-representative sample belongs in the current iteration to be the same as the sub-cluster to which the representative sample belongs in the current iteration.

In the embodiments, by keeping the latest sub-cluster to which the non-representative sample belongs to be consistent with the latest sub-cluster to which the representative sample belongs, and by a manner of selecting the representative samples, all the samples are involved in clustering, so as to obtain the real clusters based on all the samples, thereby improving accuracy of the evaluation.

Figure 3:
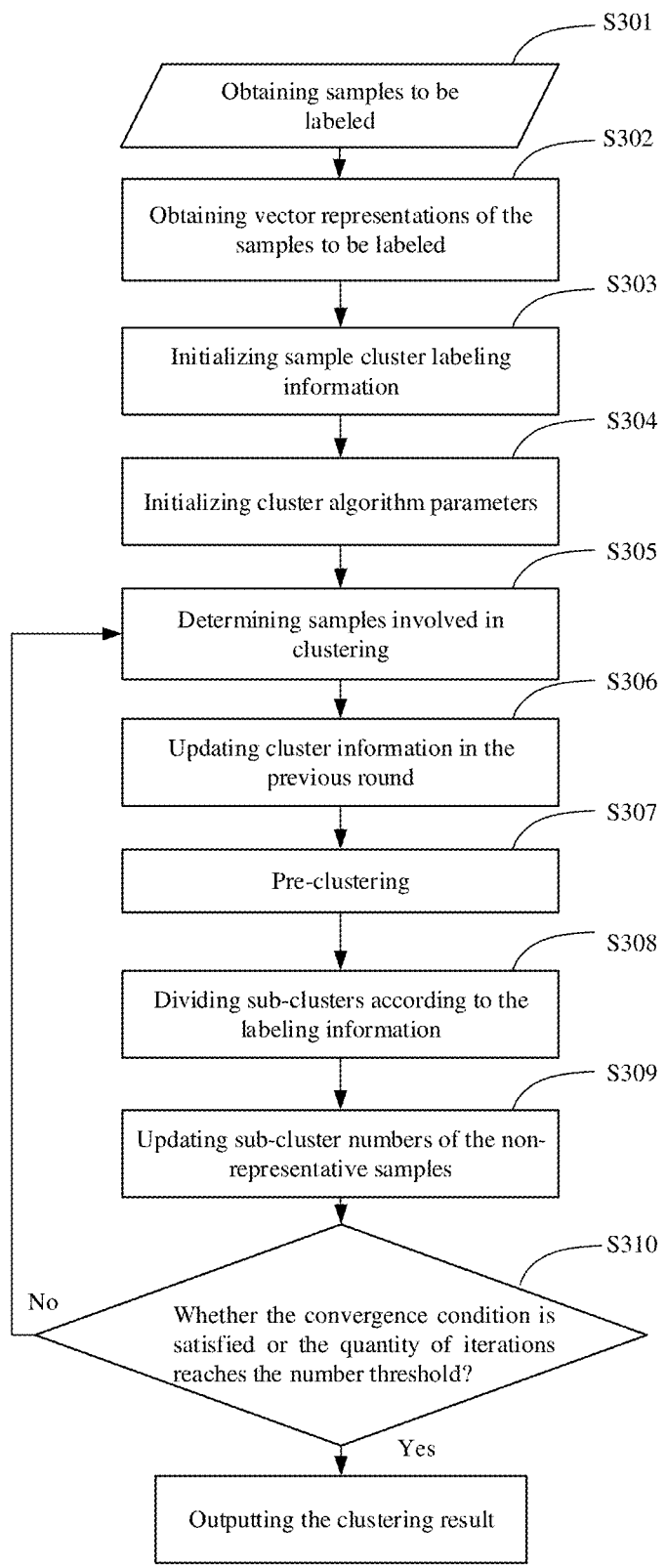
FIG. 3 is a schematic diagram of an implementation flow of a data labeling method based on artificial intelligence according to the embodiments of the present disclosure.

FIG. 3 is an implementation flow chart of the data labeling method based on artificial intelligence according to the embodiments of the present disclosure. As shown in FIG. 3, in some possible implements, the quantity of the samples n=1000 and the maximum sample number K=10 in the class cluster are taken as an example for illustrating.

The data labeling method based on artificial intelligence includes the followings.

In S301, samples to be labeled are obtained.

For example, 1000 samples to be labeled are obtained.

In S302, vector representations of the samples to be labeled are obtained.

For example, the 1000 samples to be labeled are respectively input into the Enhanced Representation from kNowledge IntEgration (ERNIE) model to obtain the vector representation of each sample to be labeled.

In S303, cluster labeling information of the samples is initialized.

Specifically, class cluster number cluster_id of each sample generated in the current round of pre-clustering is initialized to be empty, and sub-cluster number cluster_sub_id in the current round of labeling is initialized to be empty, class cluster number pre_cluster_id of each sample generated in the previous round of pre-clustering and sub-cluster number pre_cluster_sub_id in the previous round of labeling are initialized to different values. In addition, a parameter, such as is_main_sample, is set for each sample to indicate whether the sample is a representative sample mark in the sub-cluster to which the sample belongs. For example, is_main_sample is initialized to 1, which means that all samples need to be involved in clustering in the first round.

In S304, a cluster algorithm parameter is initialized.

For example, the maximum number K of samples of each class cluster while labeling is initialized to 10, and the similarity threshold is initialized to T.

In S305, the samples involved in clustering are determined.

Specifically, a sample whose is_main_sample is 1 is determined as the samples involved in clustering. Because is_main_sample of all the samples is initialized to 1, all the samples are involved in the first round of clustering.

In S306, cluster information in the previous round is updated.

Specifically, when the cluster_id of the sample is not empty, the cluster_id is assigned to the pre_cluster_id, that is, the value of the pre_cluster_id is set to be equal to the value of the cluster_id; when the cluster_sub_id of the sample is not empty, the cluster_sub_id is assigned to the pre_cluster_sub_id, that is, the value of the pre_cluster_sub_id is set be equal to the value of the cluster_sub_id. During the first iteration, since the cluster_id, the cluster_sub_id are initialized to be empty, this step is skipped.

In S307, pre-clustering is performed.

Specifically, the pre-clustering may adopt the density peaks algorithm in combination with the restriction condition to obtain the cluster_id of each sample. Alternatively, the pre-clustering may adopt the K-means algorithm in combination with the restriction condition to obtain the cluster_id of each sample.

Taking the density peaks algorithm in combination with the restriction condition as an example, a specific process may include the followings.

The density of each sample involved in clustering is determined.

The following operations for each sample involved in clustering is performed according to the descending order of densities: determining a plurality of neighboring samples of the sample involved in clustering; traversing each neighboring sample in sequence according to a descending order similarities between the neighboring samples and the sample involved in clustering, and adding the sample involved in clustering to a class cluster to which the neighboring sample belongs if the following first judgment conditions are satisfied. The first judgment conditions include the followings.

The density of the neighboring sample is greater than that of the sample involved in clustering.

The neighboring sample belongs to a class cluster.

The similarity between the neighboring sample and the sample involved in clustering is greater than or equal to the similarity threshold.

The quantity of samples in the class cluster to which the neighboring sample belongs is less than the sample number threshold.

The neighboring sample and the sample involved in clustering belong to different class clusters in the pre-cluster process of the previous iteration.

If at least one of the first judgment conditions is not satisfied, a new cluster is established, and the new cluster includes the sample involved in the clustering.

For example, according to the above manner, after the first round of clustering, the 1000 samples involved in clustering are divided into 100 class clusters, and each sample involved in clustering gets a cluster_id, the quantity of the samples in each class cluster shall not be greater than 10.

In S308, the sub-clusters are divided according to the labeling information.

Specifically, each class cluster is labeled and divided into the multiple mutually exclusive sub-clusters according to the labeling standard, and each sub-cluster is given the sub-cluster number cluster_sub_id (the sub-cluster number may contain information of the cluster number of the class cluster to which the sub-cluster belongs, for example, if the class cluster number is 1, the sub-cluster number of each sub-cluster contained in the class cluster may be 1_1, 1_2, 1_3, so as to facilitate the next round of labeling, the cluster number of the class cluster to which the sub-cluster belongs may be obtained directly through the sub-cluster number). At the same time, a sample is determined for each sub-cluster as the representative sample which is labeled with is_main_sample=1, other samples are determined as the non-representative samples, which may be labeled with is_main_sample=0.

For example, the result of the first iteration is shown in TABLE 1 below, the 1000 samples are pre-clustered into 100 sub-clusters according to the labeling information, and each sub-cluster is divided into 2 sub-clusters. Each sub-cluster contains a representative sample and a plurality of non-representative samples. All the representative samples will enter the next iteration process and continue to be involved in clustering. For non-representative samples, although they will not enter the next iteration process, they may be clustered with the representative sample in the sub-cluster to which they belong.

In S309, the sub-clusters of the non-representative samples are updated.

TABLE 1

| Class cluster (cluster_id) | Sub-cluster (cluster_sub_id) | Contained sample number (id) | Representative sample |
| --- | --- | --- | --- |
| 1 | 1-1 | 1, 2, 3, 4, 5 | 1 |
|   | 1-2 | 6, 7, 8, 9, 10 | 6 |
| 2 | 2-1 | 11, 12, 13, 14, 15 | 11 |
|   | 2-2 | 16, 17, 18, 19, 20 | 16 |
| ... |   |   |   |
| 100 | 100-1 | 991, 992, 993, 994, 995 | 991 |
|   | 100-2 | 996, 997, 998, 999, 1000 | 996 |

Specifically, the cluster_sub_id of the samples with is_main_sample=0 from the same cluster_sub_id in the previous round is assigned to cluster_sub_id of the representative sample involved in the current round of clustering.

For example, referring to TABLE 1, the sub-cluster 1-1 is formed in the first iteration process, where sample 1 is the representative sample in the sub-cluster 1-1, and the samples 2 to 5 are the non-representative samples in the sub-cluster 1-1, the sample 1 enters the second iteration process, if the sample 1 is divided into the sub-cluster T in the second iteration process, the samples 2 to 5 are also divided into the sub-cluster T, that is, the cluster_sub_id of the samples 2 to 5 is set to be equal to the cluster_sub_id of the sample 1.

In S310, it is judged whether the convergence condition is satisfied or whether the quantity of iterations reaches the number threshold, if the judgment is negative (that is, the convergence condition is not satisfied and the quantity of iterations does not reach the number threshold), the process return to step s305, and if the judgment is positive (i.e., the convergence condition is satisfied or the quantity of iterations reaches the number threshold), the clustering result is outputted. Specifically, the cluster_sub_id to which each sample belongs may be used as the clustering result.

Specifically, the clustering result is obtained by taking samples labeled with the same cluster_sub_id as one cluster.

The following detailed example illustrates the above iteration process.

It is assumed that the result of the first iteration is as shown in the above TABLE 1. In the second iteration, the sample involved in clustering are the representative samples determined in the first iteration, that is the samples 1, 6, 11, . . . 996 in table 1, which totally have a quantity of 200. It should be noted that the sub-clusters of each class cluster are mutually exclusive, and the quantity of sub-clusters is not limited to 2, but can also be 1 or any integer greater than 1, for the convenience of explanation, the 2 sub-clusters of each class cluster in TABLE 1 and TABLE 2 are taken as an example.

The second iteration result is shown as TABLE 2.

TABLE 2

| Class cluster | Sub-cluster | Included sample number | Representative sample |
| --- | --- | --- | --- |
| 1 | 1-1 | 1, 11, 21, 31, 41 | 1 |
|   | 1-2 | 51, 61, 71, 81, 91 | 51 |
| 2 | 2-1 | 6, 16, 26, 36, 46 | 16 |
|   | 2-2 | ... |   |
| ... | ... |   |   |
| 20 | 20-1 | ... |   |
|   | 20-2 | ... |   |

The samples classified into the same class cluster in the pre-clustering process of the first iteration should not be classified into the same class cluster in the second iteration.

Each iteration includes two steps: a first step of pre-clustering the samples involved in clustering to form the plurality of class clusters by using the cluster algorithm, due to the limitations of the class cluster size and the cluster algorithm itself, the class clusters divided by pre-clustering cannot represent a real classification situation. A second step is dividing each class cluster into at least one mutually exclusive sub-cluster according to the labeling information. The labeling information may be the division of each class cluster manually according to the labeling standard, and each class cluster is divided into at least one mutually exclusive sub-cluster. The labeling standard may be set according to different businesses. It can be seen that the second step can be regarded as a revision of the first step.

Based on the above contents and in combination with the above TABLE 1 and TABLE 2, an example is given to explain: as shown in TABLE 1, in the pre-clustering process of the first iteration, the sample 1 and the sample 6 are classified into the same class cluster (i.e. the class cluster 1), then, according to the labeling information, the sample 1 and the sample 6 are divided into the mutually exclusive sub-clusters, that is, the sample 1 belongs to the sub-cluster 1-1, and the sample 6 belongs to the sub-cluster 1-2. It can be considered that in the first iteration process, the second step modifies the clustering result of the first step, that is, the samples classified in the class cluster 1 in the first step (for example, the class cluster 1 in TABLE 1 includes the samples 1-10) are divided into different sub-clusters. Then, when the representative samples divided into the different sub-clusters enter the next iteration, they should not be classified into the same class cluster. The foregoing limitations may be realized by the restriction condition proposed in the embodiments of the present application. As shown in TABLE 2, the sample 1 and the sample 6 are divided into different class clusters in the pre-clustering process when the second iteration is entered.

The above example illustrates the processing manner for the representative samples, then, the processing manner for the non-representative samples are as follows.

Taking TABLE 1 and TABLE 2 as examples, in the first iteration, the sub-cluster 2-1 includes five samples, namely the samples 11, 12, 13, 14 and 15, of which the sample 11 is the representative sample, the samples 12-15 are the non-representative samples. In the second iteration, the sample 11 participates again, as the representative sample, in clustering (including two steps, i.e. the pre-clustering and the division according to the labeling information), the sample 11 is divided into the sub-cluster 1-1, that is, the sub-cluster to which the sample 11 belongs is the sub cluster 1-1, thus sub-cluster to which the non-representative samples (i.e. the samples 12-15) belonging to the same sub-cluster as the sample 11 in the first iteration belong is also updated to the sub-cluster 1-1 in the second iteration. That is, in each iteration, the non-representative samples follow the representative sample belong to the same sub-cluster in the previous iteration for classification.

After completing each iteration based on the above processing manner, it is judged whether the convergence condition is met, that is, whether the quantity of the samples in each of all class clusters is less than 10, or whether the quantity of iterations reaches the number threshold $\lceil (n-1)/(K-1) \rceil$. If neither of them is satisfied, the next iteration is continued, if either of them is satisfied, the clustering result is determined according to the labeling information for each class cluster.

Based on the above contents, labeling complexity may be analyzed. It is defined the quantity of the samples as n, the sample number threshold of samples as K, and the quantity of iterations as $m=\lceil \log_K n \rceil$, the labeling complexity in a class cluster is $C_k^2$, that is, all samples in each class cluster need two times of labeling. Generally, considering the labeling costs, the test set for clustering will not be very large, such as letting n=2000, considering that the labeling person need to have a general understanding of the whole class clusters based on clustering labeling, K is recommended to be set to about 20, with n=2000, k=20, m=3. Several extreme cases are analyzed as follows.

1. The real maximum cluster size does not exceed K, and a termination condition is reached after the first round of pre-clustering, the maximum labeling complexity is $C_k^2*n/K=n*(K-1)/2$, the maximum number n/k of class clusters is obtained by dividing the quantity of the samples by the sample number threshold of each class cluster, that is, there are at most 100 class clusters, $C_k^2$ means that the samples in each class cluster need to be compared in pairs, that is, the complexity of this method is 19000, in this case, compared the $C_n^2$ complexity of the simple and direct labeling which is 1999000, and the complexity of the simple and direct labeling is $(n-1)/(K-1) \approx 105$ times of this method.

2. All data belong to the same cluster, and a total of M rounds need to be labeled. The quantity of class clusters generated in each round is n/K, n/K^2, ... 1, and the labeling complexity is $C_k^2*(n/K+n/K^2+ \ldots +n/K^{(m-1)})$, in an extreme case, all the data belong to the same cluster and cannot be divided after each round of pre-clustering, therefore, there are still 100 class clusters after each round of clustering and labeling, and the labeling complexity of each round is $C_k^2$. Therefore, the maximum complexity may be expressed as $C_k^2*m*n/K=m*n*(K-1)/2=57000$. In this case, compared with the $C_n^2$ complexity of the simple and direct labeling, the complexity of the simple and direct labeling is $(n-1)/(m*(K-1)) \approx 35$ times of this method.

3. A case with the maximum labeling complexity is that the similarities or distances between any two samples satisfy the threshold, but they cannot be clustered together, in this method, each round of labeling may reduce n*(K-1) possibilities, so it is necessary to label (n-1)/(K-1) rounds, in each round of n/K class clusters, the labeling costs is $C_k^2*(n/k)*(n-1)/(K-1)=n*(n-1)/2$, which is the same as the complexity of the simple and direct labeling, and is $C_n^2$ times. However, this situation generally does not occur in the test cluster data sets of the real, excluding this special case, the labeling complexity of this method is lower than that of pairwise labeling.

Figure 4:
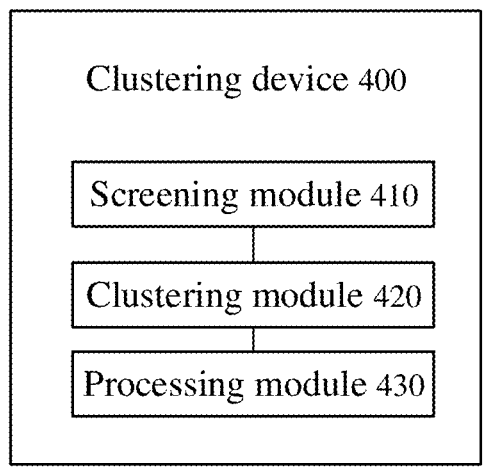
FIG. 4 is a structural diagram of a clustering device according to the embodiments of the present disclosure.

FIG. 4 is a structural diagram of a clustering device according to the embodiments of the present disclosure. The clustering device 400 shown in FIG. 4 includes the followings.

A screening module 410 is configured to determine a plurality of samples involved in clustering.

A clustering module 420 is configured to pre-cluster the plurality of samples involved in clustering, according to a vector representation of each sample involved in clustering determined by the screening module 410 or a processing module 430, to obtain a plurality of class clusters, and each class cluster contains at least one sample involved in clustering.

The processing module 430 is configured to receive labeling information for each class cluster, re-determine the plurality of samples involved in clustering, according to the labeling information, and notify the clustering module 420 of the determined plurality of samples involved in clustering, to realize iterative processing; and determine a clustering result according to the labeling information for each class cluster if a convergence condition is satisfied or a quantity of iterations reaches a number threshold.

In some possible implements, the labeling information for the class cluster includes at least one sub-cluster contained in the class cluster and a representative sample in each sub-cluster.

The processing module 430 is configured to take the representative sample in each sub-cluster in the labeling information for each class cluster as the re-determined sample involved in clustering.

In some possible implements, the above clustering module 420 is configured to pre-cluster the samples involved in clustering by using a cluster algorithm in combination with a restriction condition, so that each class cluster obtained by the pre-clustering satisfies the restriction condition.

In some possible implements, the above restriction condition includes at least one of the followings.

The quantity of samples involved in clustering contained in each class cluster is not greater than a sample number threshold.

The samples involved in clustering contained in each class cluster belong to different class clusters in the pre-clustering process of a previous iteration.

In some possible implements, the above clustering module 420 is configured to determine a density of each sample involved in clustering; perform the following operations for each sample involved in clustering according to a descending order of densities: determining a plurality of neighboring samples of the sample involved in clustering; traversing each neighboring sample in sequence according to a descending order of similarities between the neighboring samples and sample involved in clustering; and adding the sample involved in clustering to a class cluster to which the neighboring sample belongs if all the following first judgment conditions are satisfied. The first judgment conditions include the followings.

A density of the neighboring sample is greater than that of sample involved in clustering.

The neighboring sample belongs to a class cluster.

The similarity between the neighboring sample and the sample involved in clustering is greater than or equal to a similarity threshold.

A quantity of samples in the class cluster to which the neighboring sample belongs is less than the sample number threshold.

The neighboring sample and the sample involved in clustering belong to different class clusters in the pre-clustering process of the previous iteration.

In some possible implements, the above clustering module 420 is also configured to establish a new class cluster including the sample involved in clustering, if at least one of the first judgment conditions is not satisfied.

In some possible implements, the above clustering module 420 is configured to select a part from the plurality of samples involved in clustering, and take each of the selected samples involved in clustering as a cluster center; and for each sample involved in clustering other than the cluster center, add the sample involved in clustering to a class cluster to which the nearest cluster center belongs if all the following second judgment conditions are satisfied. The second judgment conditions include followings.

A quantity of samples in the class cluster to which the nearest cluster center belongs is less than the sample number threshold.

The class cluster to which the nearest cluster center belongs does not include a sample belonging to the same class cluster as the sample involved in clustering in the pre-clustering process of the previous iteration.

In some possible implements, the above clustering module 420 is also configured to add the sample involved in clustering to a class cluster to which another cluster center belongs, if at least one of the second judgment conditions is not satisfied.

In some possible implements, the above convergence condition includes that the quantity of the samples contained in each class cluster is less than the sample number threshold.

In some possible implements, the above number threshold is determined by the sample number threshold and the quantity of the samples involved in clustering in the first iteration process.

In some possible implements, the above sub-cluster includes one representative sample and at least one non-representative sample.

The processing module 430 is configured to, for the representative sample, determine the non-representative sample that belongs to the same sub-cluster as the representative sample in the previous iteration; determine a sub-cluster to which the determined non-representative sample belongs in the current iteration to be the same as the sub-cluster to which the representative sample belongs in the current iteration.

In some possible implements, the above samples involved in clustering include image samples or text samples.

Descriptions of the specific function and the example of each module and sub-module of the data processing device in the embodiments of the present disclosure may refer to the relevant descriptions of the corresponding steps in the data labeling method based on artificial intelligence in the embodiments, which will not be repeated here.

Acquisition, storage, and application of a user's personal information involved in the technical scheme of the present application all comply with provisions of relevant laws and regulations, and do not violate public order and good customs.

According to the embodiments of the present disclosure, the present disclosure also provides an electronic apparatus, a readable storage medium and a computer program product.

Figure 5:
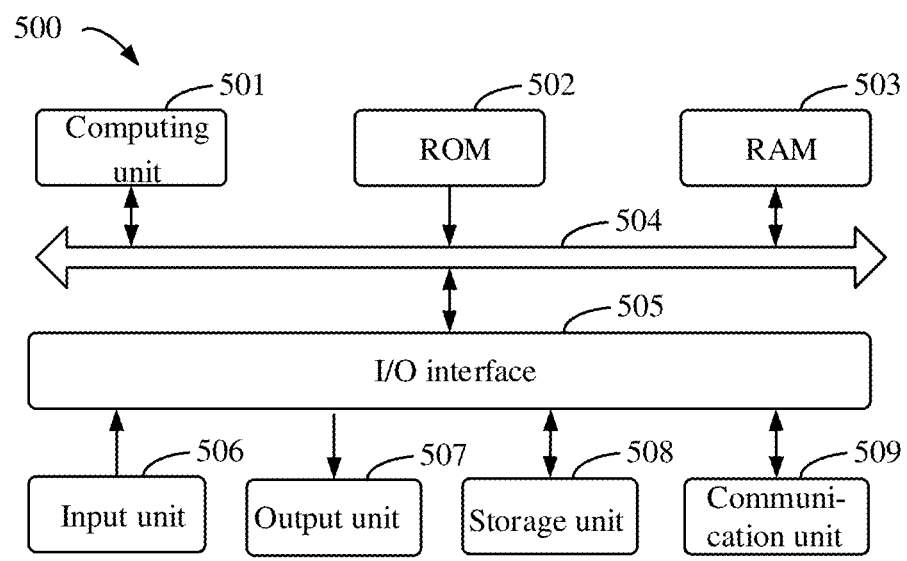
FIG. 5 is a schematic block diagram of an example electronic apparatus that may be used to implement the embodiments of the present disclosure.

FIG. 5 shows a schematic block diagram of an example electronic apparatus 500 that may be used to implement the embodiments of the present disclosure. The electronic apparatus is intended to represent various forms of digital computers, such as, a laptop, a desktop, a workstation, a personal digital assistant, a server, a blade server, a mainframe computer, and other suitable computers. The electronic apparatus may also represent various forms of mobile devices, such as, a personal digital processing, a cellular phone, a smart phone, a wearable apparatus, and other similar computing devices. The components shown herein, their connections and relationships, and their functions are merely examples, and are not intended to limit the implementations of the present disclosure described and/or required herein.

As shown in FIG. 5, the apparatus 500 includes a computing unit 501 which may perform an appropriate action and an appropriate process based on a computer program stored in a read only memory (ROM) 502 or a computer program loaded into a random access memory (RAM) 503 from a storage unit 508. Various programs and data required for an operation of the apparatus 500 may also be stored in the RAM 503. The computing unit 501, the ROM 502 and the RAM 503 are connected to each other through a bus 504. An input/output (I/O) interface 505 is also connected to the bus 504.

The plurality of components connected to the I/O interface 505 in the apparatus 500 includes an input unit 506 such as a keyboard, a mouse, or the like, an output unit 507 such as various types of displays, speakers, or the like, the storage unit 508 such as a magnetic disk, an optical disk, or the like, and a communication unit 509 such as a network card, a modem, a wireless communication transceiver, or the like. The communication unit 509 allows the apparatus 500 to exchange information/data with other devices through a computer network such as the Internet and/or various telecommunication networks.

The computing unit 501 may be various general-purpose and/or special-purpose processing components with processing and computing capabilities. Some examples of the computing unit 501 include, but are not limited to, a central processing unit (CPU), a graphics processing unit (GPU), various dedicated artificial intelligence (AI) computing chips, various computing units running machine learning model algorithms, a digital signal processor (DSP), and any appropriate processors, controllers, microcontrollers, or the like. The computing unit 501 performs various methods and processes described above, such as the data labeling method based on artificial intelligence. For example, in some implementations, the data labeling method based on artificial intelligence may be implemented as a computer software program, which is tangibly contained in a machine-readable medium, such as the storage unit 508. In some implementations, a part or all of the computer program may be loaded into and/or installed on the apparatus 500 via the ROM 502 and/or the communication unit 509. When the computer program is loaded into the RAM 503 and executed by the computing unit 501, one or more steps of the data labeling method based on artificial intelligence described above may be performed. Alternatively, in other implementations, the computing unit 501 may be configured to perform the data labeling method based on artificial intelligence by any other suitable means (e.g., by means of firmware).

Various implements of the system and technologies described above herein may be implemented in a digital electronic circuit system, an integrated circuit system, field programmable gate array (FPGA), an application specific integrated circuit (ASIC), a special standard product (ASSP), a system on chip (SOC), a load programmable logic device (CPLD), a computer hardware, firmware, software, and/or a combination thereof. These various implementations may include being implemented in one or more computer programs that may be executed and/or interpreted on a programmable system including at least one programmable processor, the programmable processor may be a special-purpose or general-purpose programmable processor, and may receive data and an instruction from a storage system, at least one input device, and at least one output device, and transmit the data and the instruction to the storage system, the at least one input device, and the at least one output device.

Program codes for implementing the method of the present disclosure may be written in any combination of one or more programming languages. These program codes may be provided to a general-purpose computer, a special-purpose computer, or other programmable data processing devices, enables the program codes, when executed by a processor or a controller, to cause the functions/operations specified in the flowcharts and/or block diagrams to be implemented. The program codes may be completely executed on a machine, partially executed on the machine, partially executed on the machine as a separate software package and partially executed on a remote machine, or completely executed on the remote machine or a server.

In the context of the present disclosure, the machine-readable medium may be a tangible medium, which may contain or store a procedure for use by or in connection with an instruction execution system, a device, or an apparatus. The machine-readable medium may include, but is not limited to, an electronic medium, a magnetic medium, an optical medium, an electromagnetic medium, an infrared medium, or a semiconductor system, a semiconductor device, or a semiconductor apparatus, or any suitable combination of thereof. More specific examples of the machine-readable storage medium may include electrical connections based on one or more lines, a portable computer disk, a hard disk, a random access memory (RAM), a read only memory (ROM), an erasable programmable read only memory (EPROM or a flash memory)), optical fiber, a portable compact disk read only memory (CD-ROM), an optical storage device, a magnetic storage device, or any suitable combination of thereof.

In order to provide interaction with a user, the system and techniques described herein may be implemented on a computer, the computer has a display device (e.g., a cathode ray tube (CRT) or a liquid crystal display (LCD) monitor) for displaying information to the user, and a keyboard and a pointing device (e.g., a mouse or a trackball) through which the user may provide an input to the computer. Other kinds of devices may also be used to provide interaction with user. For example, feedback provided to the user may be any form of sensory feedback (e.g., visual feedback, auditory feedback, or tactile feedback), and the input from the user may be received in any form (including an acoustic input, a voice input, or a tactile input).

The system and techniques described herein may be implemented in a computing system including a background component (e.g., as a data server), or in a computing system including a middleware component (e.g., an application server), or in a computing system including a front-end component (e.g., a user computer with a graphical user interface or a web browser, the user may interact with the implement of the system and technologies described herein through the graphical user interface or the web browser), or in a computing system including any combination of the background component, the middleware component, or the front-end component. The components of the system may be interconnected by digital data communication (e.g., a communication network) in any form or medium. Examples of the communication network include a local area network (LAN), a wide area network (WAN), and Internet.

A computer system may include a client and a server. The client and the server are generally far away from each other and usually interact with each other through a communication network. A relationship between the client and the server arises by a computer program running on a corresponding computer and having a client-server relationship with each other. The server may be a cloud server, a server of a distributed system, or a server combined with a block chain.

It should be understood that the steps may be reordered, added, or removed by using the various forms of the flows described above. For example, the steps recorded in the present disclosure can be performed in parallel sequentially or in different orders, as long as a desired result of the technical scheme disclosed in the present disclosure may be realized, which is not limited herein.

The above specific implements do not constitute a restriction on the protection scope of the present disclosure. Those skilled in the art should understand that, according to a design requirement and other factors, various modifications, combinations, sub combinations and substitutions may be made. Any modification, equivalent replacement, improvement, or the like made within the spirit and principles of the present disclosure shall be included in the protection scope of the present disclosure.

What is claimed is:

1. A data labeling method based on artificial intelligence, comprising:
   determining a plurality of samples involved in clustering;
   performing a plurality of following operations circularly to realize iterative processing, until a convergence condition is satisfied, or a quantity of iterations reaches a number threshold, comprising:
      pre-clustering the plurality of samples involved in clustering, according to a vector representation of the respective samples involved in clustering, to obtain a plurality of class clusters, wherein each class cluster contains at least one sample involved in clustering;
      receiving labeling information for the respective class clusters, wherein the labeling information for the respective class clusters comprises: at least one sub-cluster contained in the respective class clusters, and a representative sample in each sub-cluster, wherein the sub-cluster comprises one representative sample and at least one non-representative sample;
      re-determining the plurality of samples involved in clustering, according to the labeling information by:

taking the representative sample in the sub-cluster in the labeling information for the respective class clusters, as the re-determined plurality of samples involved in clustering;

for the representative sample, determining a non-representative sample that belongs to, in a previous iteration process, a same sub-cluster as the representative sample; and determining a sub-cluster to which the non-representative sample belongs in a current iteration process, to be the same as a sub-cluster to which the representative sample belongs in the current iteration process; and determining a clustering result according to the labeling information for the respective class clusters.

2. The method of claim 1, wherein pre-clustering the plurality of samples involved in clustering, according to the vector representation of the respective samples involved in clustering, comprises:

pre-clustering the plurality of samples involved in clustering, by using a cluster algorithm in combination with a restriction condition, to enable the respective class clusters obtained by the pre-clustering to satisfy the restriction condition.

3. The method of claim 2, wherein the restriction condition comprises at least one of:

that a quantity of samples involved in clustering contained in each class cluster is not greater than a sample number threshold; or that respective samples involved in clustering contained in each class cluster belong to, in a pre-clustering process of a last iterative processing, different class clusters.

4. The method of claim 3, wherein pre-clustering the plurality of samples involved in clustering, by using the cluster algorithm in combination with the restriction condition, comprises:

determining a density of the respective samples involved in clustering; and performing following operations for the respective samples involved in clustering respectively, according to a descending order of densities:

determining a plurality of neighboring samples of a sample involved in clustering; and traversing the respective neighboring samples in sequence according to a descending order of similarities between the respective neighboring samples and the sample involved in clustering, wherein the sample involved in clustering is added to a class cluster to which a neighboring sample belongs, in a case of all of first judgment conditions are satisfied, wherein the first judgment conditions comprise:

that a density of the neighboring sample is greater than a density of the sample involved in clustering;

that the class cluster to which the neighboring sample belongs exists;

that a similarity between the neighboring sample and the sample involved in clustering is greater than or equal to a similarity threshold;

that a quantity of samples contained in the class cluster to which the neighboring sample belongs is less than the sample number threshold; and that the neighboring sample and the sample involved in clustering belong to, in the pre-clustering process of the last iterative processing, different class clusters.

5. The method of claim 4, further comprising: establishing a new class cluster, in a case of at least one of the first judgment conditions is not satisfied, the new class cluster including the sample involved in clustering.

6. The method of claim 3, wherein pre-clustering the plurality of samples involved in clustering, by using the cluster algorithm in combination with the restriction condition, comprises:

selecting a part from the plurality of samples involved in clustering;

taking each selected sample involved in clustering as a cluster center; and for each sample involved in clustering other than the cluster center, adding the sample involved in clustering to a class cluster to which a nearest cluster center belongs, in a case of all of second judgment conditions are satisfied, wherein the second judgment conditions comprise:

that a quantity of samples contained in the class cluster to which the nearest cluster center belongs is less than the sample number threshold; and that the class cluster to which the nearest cluster center belongs does not include a sample, wherein the sample belongs to, in the pre-clustering process of the last iterative processing, a same class cluster as the sample involved in clustering.

7. The method of claim 6, further comprising: adding the sample involved in clustering to a class cluster to which another cluster center belongs, in a case of at least one of the second judgment conditions is not satisfied.

8. The method of claim 3, wherein the convergence condition comprises that a quantity of samples contained in the respective class clusters is less than the sample number threshold.

9. The method of claim 3, wherein the number threshold is determined by the sample number threshold and a quantity of samples involved in clustering in a first iteration process.

10. The method of claim 1, wherein the sample involved in clustering comprises an image sample or a text sample.

11. An electronic apparatus, comprising:

at least one processor; and a memory connected in communication with the at least one processor, wherein the memory stores an instruction executable by the at least one processor, and the instruction, when executed by the at least one processor, enables the at least one processor to execute:

determining a plurality of samples involved in clustering;

performing following operations circularly to realize iterative processing, until a convergence condition is satisfied, or a quantity of iterations reaches a number threshold:

pre-clustering the plurality of samples involved in clustering, according to a vector representation of the respective samples involved in clustering, to obtain a plurality of class clusters, wherein each class cluster contains at least one sample involved in clustering;

receiving labeling information for the respective class clusters, wherein the labeling information for the respective class clusters comprises: at least one sub-cluster contained in the respective class clusters, and a representative sample in each sub-cluster, wherein the sub-cluster comprises one representative sample and at least one non-representative sample;

re-determining the plurality of samples involved in clustering, according to the labeling information by:

taking the representative sample in the sub-cluster in the labeling information for the respective class clusters, as the re-determined plurality of samples involved in clustering;

for the representative sample, determining a non-representative sample that belongs to, in a previous iteration process, a same sub-cluster as the representative sample; and determining a sub-cluster to which the non-representative sample belongs in a current iteration process, to be the same as a sub-cluster to which the representative sample belongs in the current iteration process; and determining a clustering result according to the labeling information for the respective class clusters.

12. The electronic apparatus of claim 11, wherein the instruction, when executed by the at least one processor, further enables the at least one processor to execute:

pre-clustering the plurality of samples involved in clustering, by using a cluster algorithm in combination with a restriction condition, to enable the respective class clusters obtained by the pre-clustering to satisfy the restriction condition.

13. The electronic apparatus of claim 12, wherein the restriction condition comprises at least one of:

that a quantity of samples involved in clustering contained in each class cluster is not greater than a sample number threshold; or that respective samples involved in clustering contained in each class cluster belong to, in a pre-clustering process of a last iterative processing, different class clusters.

14. The electronic apparatus of claim 13, wherein the instruction, when executed by the at least one processor, further enables the at least one processor to execute:

determining a density of the respective samples involved in clustering; and performing a plurality of following operations for the respective samples involved in clustering respectively, according to a descending order of densities, comprising:

determining a plurality of neighboring samples of a sample involved in clustering; and traversing the respective neighboring samples in sequence according to a descending order of similarities between the respective neighboring samples and the sample involved in clustering, wherein the sample involved in clustering is added to a class cluster to which a neighboring sample belongs, in a case of all of first judgment conditions are satisfied, wherein the first judgment conditions comprise:

that a density of the neighboring sample is greater than a density of the sample involved in clustering;

that the class cluster to which the neighboring sample belongs exists;

that a similarity between the neighboring sample and the sample involved in clustering is greater than or equal to a similarity threshold;

that a quantity of samples contained in the class cluster to which the neighboring sample belongs is less than the sample number threshold; and that the neighboring sample and the sample involved in clustering belong to, in the pre-clustering process of the last iterative processing, different class clusters.

15. The electronic apparatus of claim 14, wherein the instruction, when executed by the at least one processor, further enables the at least one processor to execute:

establishing a new class cluster, in a case of at least one of the first judgment conditions is not satisfied, the new class cluster including the sample involved in clustering.

16. The electronic apparatus of claim 13, wherein the instruction, when executed by the at least one processor, further enables the at least one processor to execute:

selecting a part from the plurality of samples involved in clustering;

taking each selected sample involved in clustering as a cluster center; and for each sample involved in clustering other than the cluster center, adding the sample involved in clustering to a class cluster to which a nearest cluster center belongs, in a case of all of second judgment conditions are satisfied, wherein the second judgment conditions comprise:

that a quantity of samples contained in the class cluster to which the nearest cluster center belongs is less than the sample number threshold; and that the class cluster to which the nearest cluster center belongs does not include a sample, wherein the sample belongs to, in the pre-clustering process of the last iterative processing, a same class cluster as the sample involved in clustering.

17. A non-transitory computer-readable storage medium storing a computer instruction thereon, wherein the computer instruction is used to enable a computer to execute:

determining a plurality of samples involved in clustering;

performing a plurality of following operations circularly to realize iterative processing, until a convergence condition is satisfied or a quantity of iterations reaches a number threshold, comprising:

pre-clustering the plurality of samples involved in clustering, according to a vector representation of the respective samples involved in clustering, to obtain a plurality of class clusters, wherein each class cluster contains at least one sample involved in clustering;

receiving labeling information for the respective class clusters, wherein the labeling information for the respective class clusters comprises: at least one sub-cluster contained in the respective class clusters, and a representative sample in each sub-cluster, wherein the sub-cluster comprises one representative sample and at least one non-representative sample;

re-determining the plurality of samples involved in clustering, according to the labeling information by:

taking the representative sample in the sub-cluster in the labeling information for the respective class clusters, as the re-determined plurality of samples involved in clustering;

for the representative sample, determining a non-representative sample that belongs to, in a previous iteration process, a same sub-cluster as the representative sample; and determining a sub-cluster to which the non-representative sample belongs in a current iteration process, to be the same as a sub-cluster to which the representative sample belongs in the current iteration process; and determining a clustering result according to the labeling information for the respective class clusters.

* * * * *